United States Patent [19]

Inoue et al.

[11] Patent Number: 4,682,353
[45] Date of Patent: Jul. 21, 1987

[54] KEY TELEPHONE SYSTEM

[75] Inventors: Masayoshi Inoue; Kenichiro Hirano; Ryoichi Tanihata, all of Tokyo, Japan

[73] Assignee: NEC Corporation, Japan

[21] Appl. No.: 840,732

[22] Filed: Mar. 18, 1986

[30] Foreign Application Priority Data

Mar. 20, 1985 [JP] Japan .................................. 60-57329

[51] Int. Cl.⁴ .......................... H04M 3/42; H04M 1/00
[52] U.S. Cl. ...................................... 379/163; 379/162; 379/156
[58] Field of Search ............... 379/156, 157, 158, 159, 379/160, 161, 162, 163, 164, 165, 166, 210, 212, 213, 214

[56] References Cited

U.S. PATENT DOCUMENTS

| | | | |
|---|---|---|---|
| 4,046,972 | 9/1977 | Huizinga et al. | 379/165 |
| 4,109,113 | 8/1978 | Allison, Jr. et al. | 379/164 |
| 4,132,860 | 1/1979 | Rasmussen | 379/165 |
| 4,150,257 | 4/1979 | Fenton et al. | 379/212 |
| 4,196,316 | 4/1980 | McEowen et al. | 379/165 |

Primary Examiner—Gene Z. Rubinson
Assistant Examiner—Lawrence Fess
Attorney, Agent, or Firm—Laff, Whitesel, Conte & Saret

[57] ABSTRACT

A key telephone system has a plurality of telephone sets, each set having a hold button for temporarily holding a central office ("CO") line. A plurality of cell park lamps temporarily indicate which of the CO lines is being held. A plurality of call park buttons are individually associated with the call park lamps. An outgoing call button is used for seizing an idle one of the CO lines when an outgoing call is to be initiated. An answer button is used for seizing one of the CO lines over which an incoming call is being received. At least one external indicator indicates the various states (busy, idle, holding) of each of the CO lines. A central unit has a hold control circuit for indicating with the call park lamps when the CO line is being held responsive to an operation of either the hold button or a call park button. A CO line selecting circuit is provided for selecting and seizing an idle one of the CO lines, in response to an operation of the outgoing call button, and one of the CO lines over which an incoming call is being received in response to an operation of the answer button. A CO line indication control circuit controls the external indicator to indicate the states of the CO lines.

9 Claims, 18 Drawing Figures

CO LINE STATE MEMORY ~105

| CO LINE | DATA |
|---------|------|
| L1 | 01H |
| L2 | 01H |
| L3 | 03H |
| L4 | 02H |
| L5 | 00H |
| L6 | 00H |
| L7 | 00H |
| L8 | 02H |

*FIG. 11A*

| DATA | STATE OF CO LINE |
|------|------------------|
| 00H | IDLE |
| 01H | INCOMING |
| 02H | USE |
| 03H | HOLD |

*FIG. 11B*

KEY TELEPHONE SYSTEM

BACKGROUND OF THE INVENTION

1. Field of the Invention

This invention relates to a key telephone system (hereunder briefly referred to as a "KT system").

2. Description of the Prior Art

A KT system is essential for making a connection between one of a plurality of telephone sets and a selected one of a plurality of central office (CO) lines extending to the KT system. A prior art KT system includes a plurality of telephone sets and a central unit adapted to selectively set up a connection between the telephone sets and the CO lines. Each of the telephone sets is provided with a hold button and a plurality of sets of CO lamps and CO buttons, each set corresponding on a one-to-one basis to the CO lines accommodated in the central unit. The CO lamps shows the user of the KT system a status of individually associated CO lines. A CO lamp turns off while the CO line is idle, turns on while the CO line is in use, flashes slowly while the CO line is being held, and flashes rapidly while an incoming call is being received over the CO line.

The CO buttons are available for selecting and seizing any of the CO lines. The central units detect an operation of the CO buttons which may occur at any telephone set so as to connect the telephone set to the selected CO line. For example, to make an outgoing call, the CO button is operated to seize the idle CO line. To answer an incoming call, the CO button is operated to seize the CO line over which the incoming call is being received. Further, while a certain CO line which has been connected to a certain telephone set is being held by the hold button, it may be picked up at another telephone set through the operation of its CO button associated with that CO line. Stated another way, the CO line over which an incoming call is received may be transferred from one telephone set to another.

An example of a KT line of the type being described is disclosed in U.S. Pat. No. 4,132,860. The problem with such a prior art KT system is that the number of the CO lamps and of the CO buttons on each station set have to be increased in proportion to the number of the CO lines, rendering the telephone set bulky and expensive.

In the above-described prior are KT system, to pick up an idle CO line for initiating an outgoing call or to seize a CO line for answering an incoming call which is received over that CO line, the user at the telephone set needs to check the CO lamps and then depress one of the CO buttons which is associated with the CO line. A KT system which, for a more efficient operation, allows the telephone set to automatically seize a predetermined one of the CO lines as a prime line when a handset thereof is taken up is described in U.S. Pat. No. 4,196,316. This automatic acquisition scheme, however, still has a problem while the prime line is in use, since it is necessary to select and seize another CO line, by means of an awkward operation. Especially, concerning an incoming call which usually requires a rapid response, a quick recognition of the CO line having an incoming call is so difficult that the user is apt to interrupt a circuit which is in use due to an inadvertent operation of the CO buttons. Such erroneous operation of the CO buttons, also occurs frequently while a circuit is in a hold condition as a result of a misperception of the flashing conditions of the CO lamps.

SUMMARY OF THE INVENTION

It is, therefore, an object of this invention to eliminate the disadvantages of the prior art KT system as described above and to provide a KT system which promotes an efficient operation.

It is another object of this invention to provide a KT system which is equipped with telephone sets which are a small size and are inexpensive.

In order to achieve the above objects, a KT system of this invention comprises a plurality of telephone sets, each having a hold button for temporarily holding a CO line over which a communication is being held. A plurality of call park lamps temporarily indicate that the CO line is being held. A plurality of call park buttons are individually associated with the call park lamps. An outgoing call button is used for seizing an idle one of the CO lines when an outgoing call is to be initiated. An answer button is used for seizing one of the CO lines over which an incoming call is being received so as to respond to the incoming call. At least one external indicator indicates the states of all of the CO lines.

A central unit has hold control means for indicating with the call park lamps when the CO line is being held responsive to an operation of the hold button and for controlling a response to that CO line being held in response to an operation of the call park button. A CO line selecting means is provided for selecting and seizing an idle one of the CO lines, in response to an operation of the outgoing call button, and one of the CO lines over which an incoming call is being received in response to an operation of the answer button. A CO line indication control means controls the external indicator to indicate the states of the CO lines.

BRIEF DESCRIPTION OF THE DRAWINGS

The above-mentioned objects and features of this invention can be more clearly understood from the following detailed description and attached drawings in which:

FIG. 11A shows details of a memory which is adapted to store states of CO lines;

FIG. 11B shows a correspondence between data stored in the memory of FIG. 11A and the states of CO lines;

In these drawings, the same reference numerals denote the same structural elements.

DESCRIPTION OF THE PREFERRED EMBODIMENTS

Figure 1:
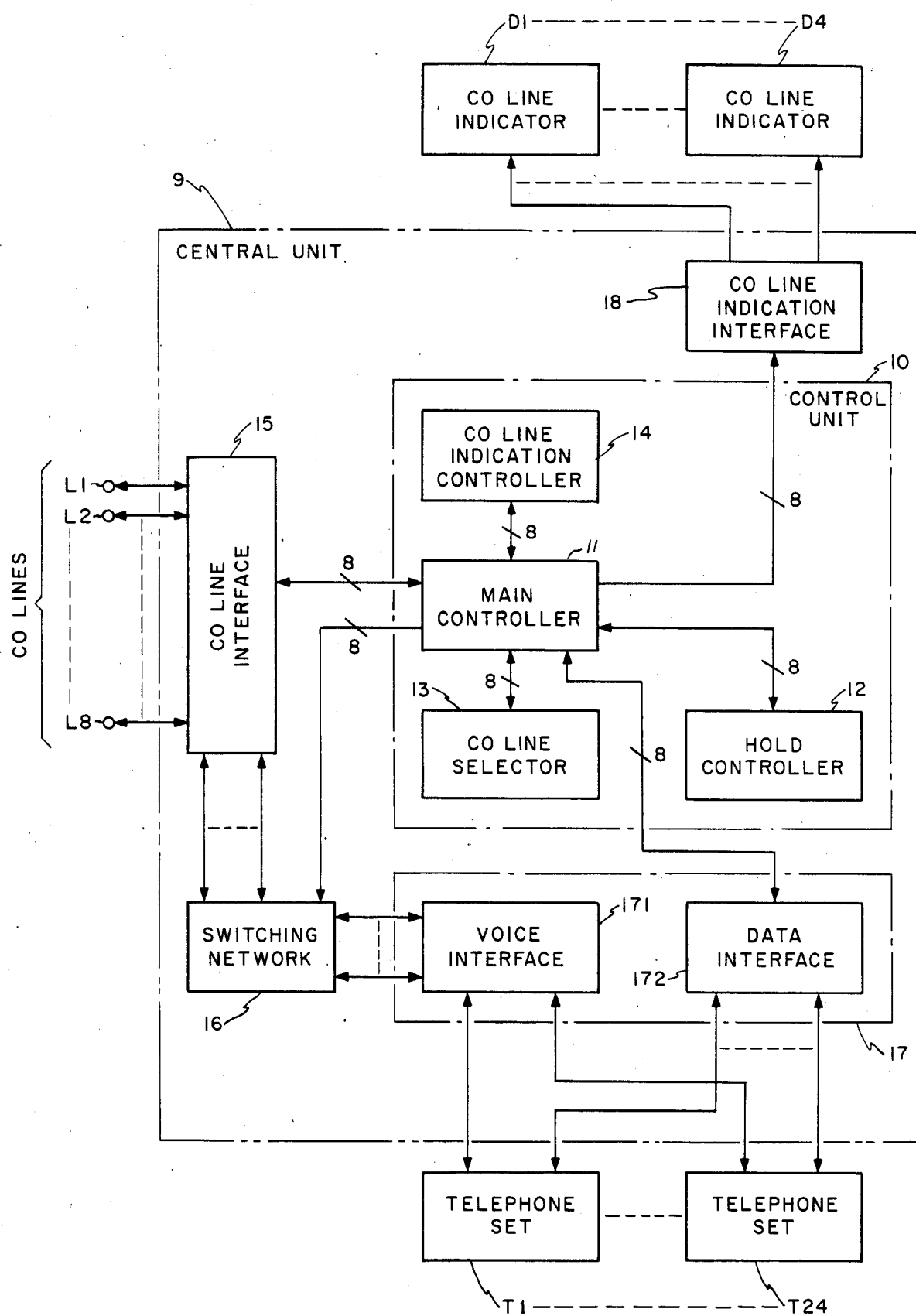
FIG. 1 is a block diagram of an embodiment of this invention.

Referring to FIG. 1, an embodiment of this invention comprises a central unit 9 for accommodating a plurality of CO lines L1 to L8, a plurality of telephone sets T1 to T24, and a plurality of external CO line indicators D1 to D4 which are adapted to display various states of the CO lines L1 to L8.

The central unit 9 includes a control unit 10 which supervises the whole KT system, a CO line interface 15 for accommodating the CO lines L1 to L8, a switching network 16, a telephone interface 17, and a CO line indication interface 18. Connected to a central office, each of the CO lines L1 to L8 is identified by a particular subscriber's number. The interface 15 detects an incoming call (ring detection) on any of the CO lines L1 to L8, sending dial signals to any of the CO lines L1 to L8, and analog/digital converting of voice signals.

Figure 2:
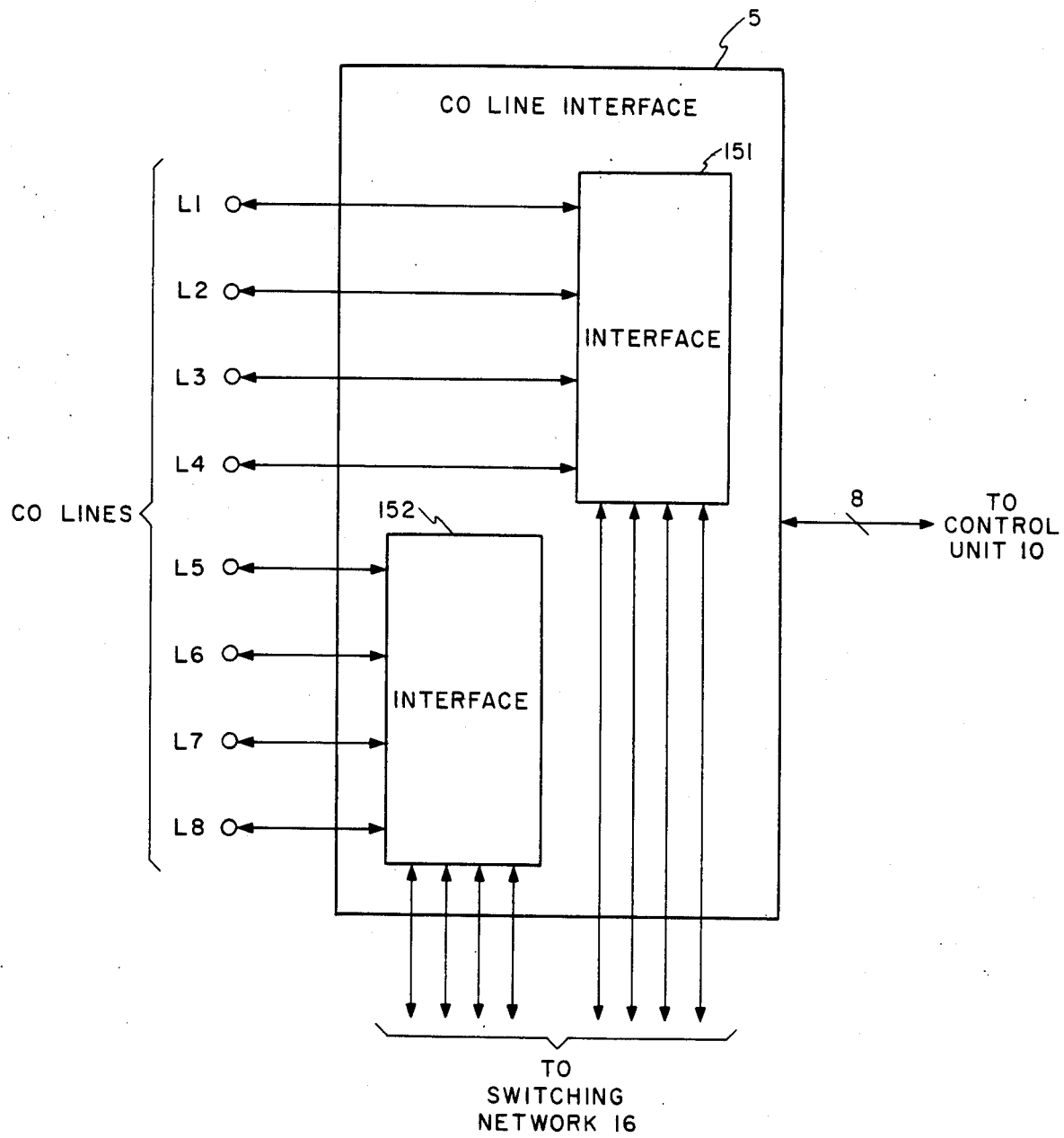
FIGS. 2, 3 and 4 each shows a part of the embodiment of FIG. 1.

As shown in FIG. 2, the interface 15 comprises interfaces 151 and 152 which accommodate, respectively, the CO lines L1 to L4 and the CO lines L5 to L8. The telephone interface 17 (FIG. 1) comprises a voice interface 171 connected to voice lines of the respective telephone sets, and a data interface 172 connected to data lines of the same telephone sets. The voice interface 171 and the data interface 172 are connected to the switching network 16 and to the control unit 10, respectively. The interface 171 performs digital/analog conversion of voice signals.

Figure 3:
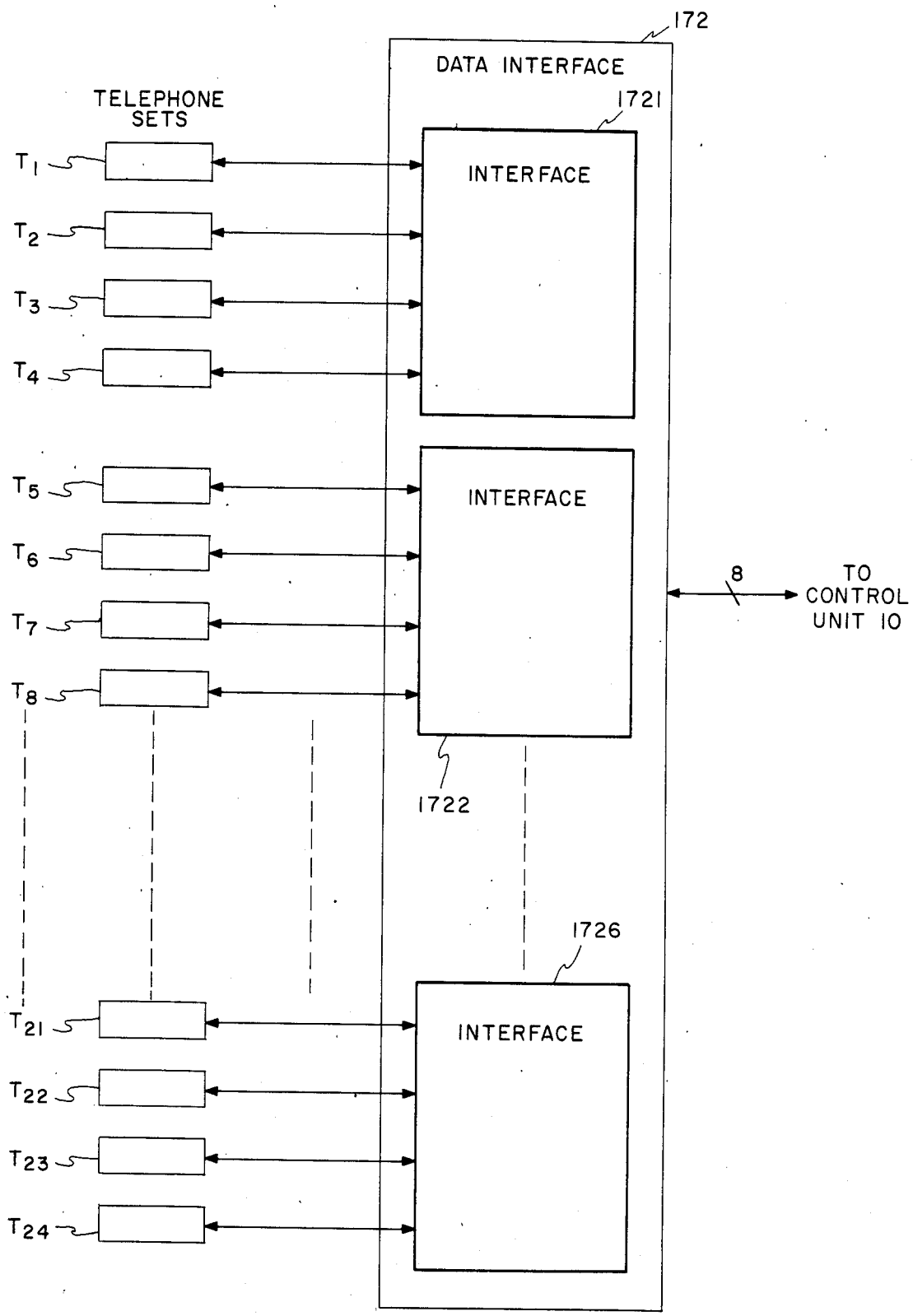

As shown in FIG. 3, the interface 172 comprises interfaces 1721, 1722, . . . , 1726, respectively, are connected to the telephone sets T1 to T4, T5 to T8, . . . , T21 to T24. The switching network 16 (FIG. 1) sets up communication paths between the CO Lines L1 to L8 and the telephone sets T1 to T24 on a time division basis responsive to a control signal applied from the control unit 10. A holding function of the CO lines is assigned to the network 16. The CO line indication interface 18 fetches display data from the unit 10 so as to display the states of the respective CO lines on the CO line indicators D1 to D4.

Figure 4:
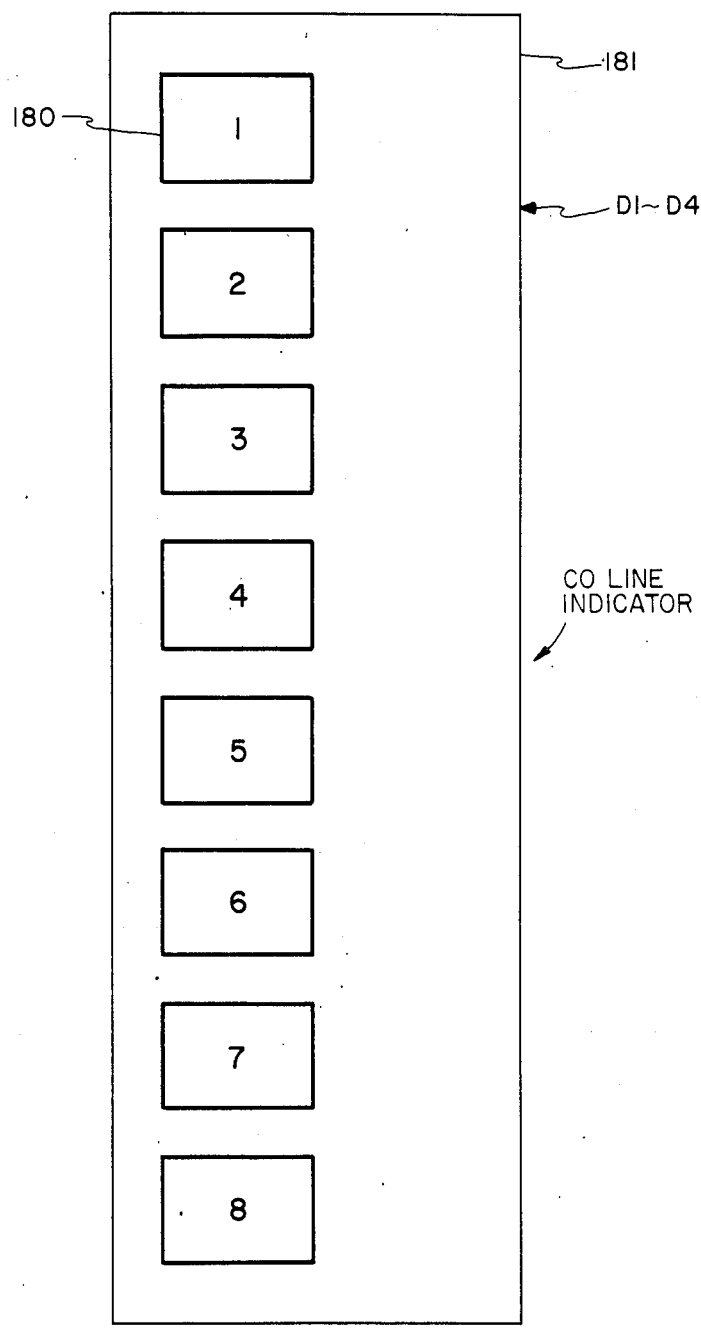

As shown in FIG. 4, each of the indicators D1 to D4 has CO lamps 180 respectively associated with the CO lines L1 to L8 and fixed to a panel 181. The CO lamps 180 show an "idle" state, a "use" state, a "hold" state and an "incoming" state of their individually associated CO lines by turning off, turning on, flashing slowly, and flashing rapidly, respectively. One of the indicators D1 to D4 may be installed in each room, in a location which is easy to see. The number of such locations is open to choice. Analog signals are propagated over the CO lines L1 to L8, (FIG. 1) voice lines between the telephone sets T1 to T24 and the voice interface 171, and lines between the CO line indication interface 18 and the indicators D1 to D4. Digital signals are propagated over the other lines, i.e., lines installed in the control unit 10.

Figure 5:
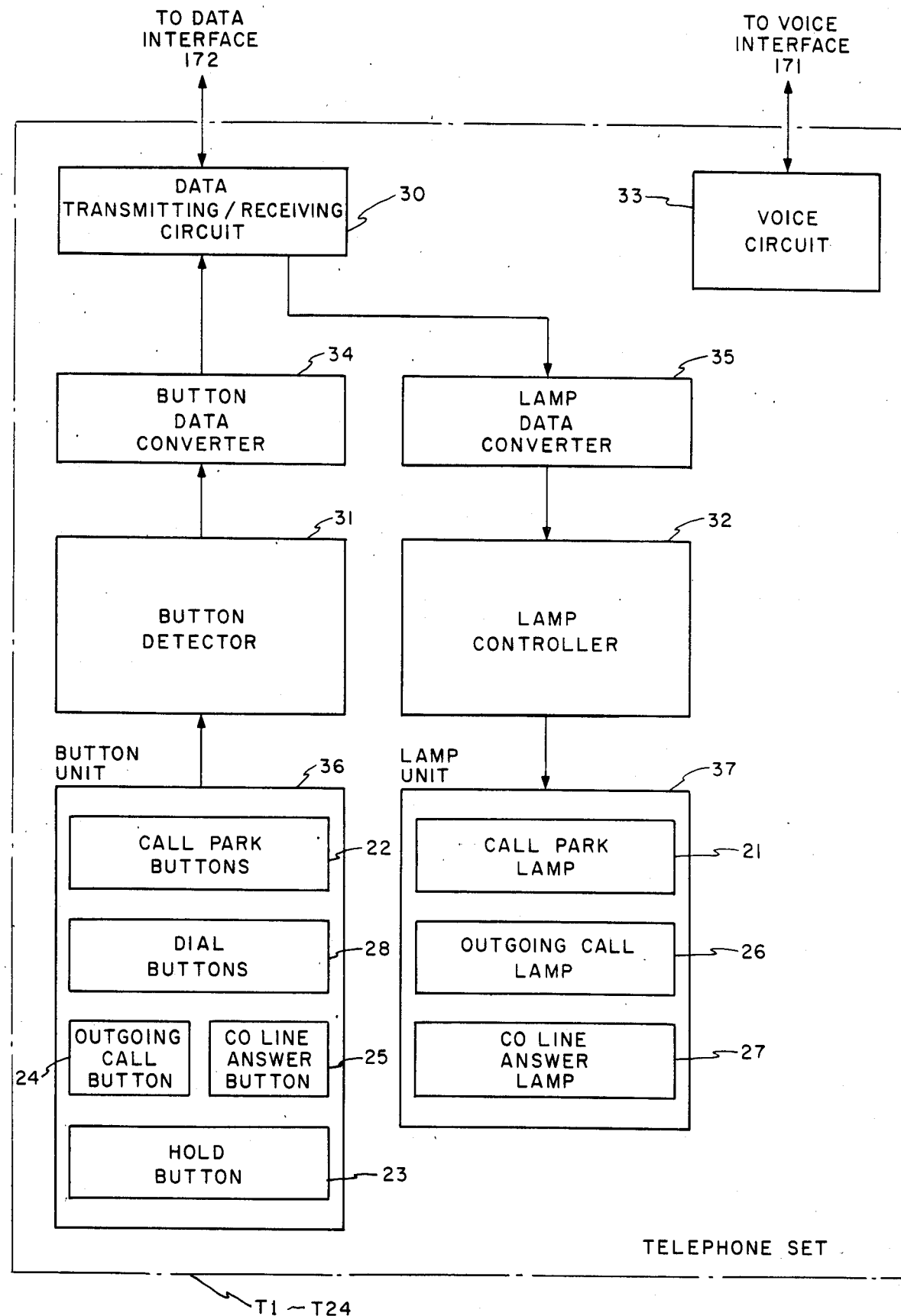
FIGS. 5 and 6 respectively are a block diagram and an external view of a telephone set used in the embodiment of FIG. 1.

Referring to FIG. 5, each of the telephone set T1 to T24 comprises a data transmitting/receiving circuit 30 connected to the data interface 172 to interchange data with the central unit 9 (FIG. 1). A button detector 31 detects the operation of a button unit 36. A button data converter 34 converts the detected button operation data into codes, one of which is assigned to each of the buttons. Converter 34 sends the codes to the circuit 30. A lamp data converter 35 transforms lamp data which is received by the circuit 30 into a particular code. A lamp controller 32 controls lamps in a lamp unit 37 responsive to the output code from the converter 35. A voice circuit 33 connects to the voice interface 171.

Figures 6, 12A, 12B:
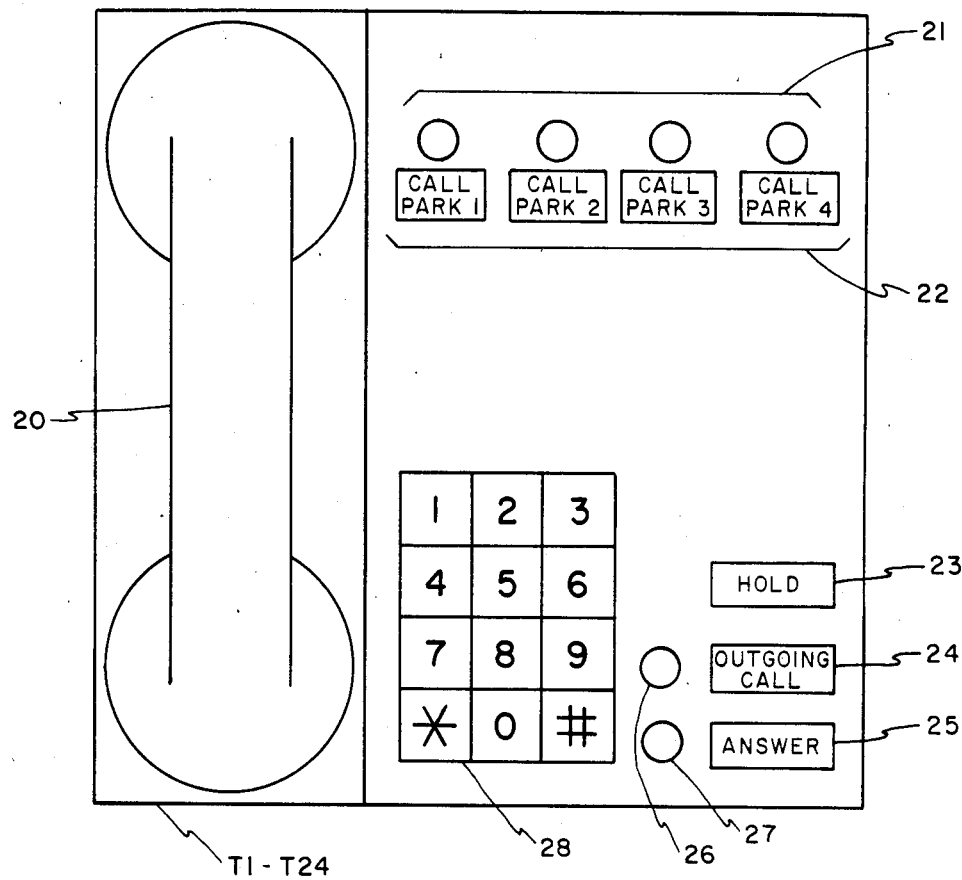
FIG. 12A shows details of a memory adapted to store status of CO lines being held.
FIG. 12B shows a correspondence between data stored in the memory of FIG. 12A and CO line numbers.

Referring also to FIG. 6, the button unit 36 comprises call park buttons 22, a hold button 23, an outgoing call button 24, a CO line answer button 25, and dial buttons 28. The lamp unit 37 comprises call park lamps 21, an outgoing call lamp 26, and a CO line answer lamp 27. The voice circuit 33 includes a handset 20. The outgoing call button 24 is used to seize an idle CO line for initiating an outgoing call. The outgoing call lamp 28 glows in green when an idle CO line is seized and in red when no idle CO line is available. The answer button 25 is used to answer a CO line over which an incoming call has come in. The answer lamp 27 is paired with the button 25 and glows in red when an incoming call has come in over a CO line and in green when user has responded to a CO line which is receiving an incoming call or which is being held. The hold button 23 is operated to hold a CO line on which a call is in progress. The call park lamps 21 are adapted to show which of the CO lines is being held. Guided by the lamps 21, the user may depress any of the call park buttons 22 which correspond on a one-to-one basis to the CO lines being held, in order to answer a CO line which is being held. In this embodiment, the number of CO lines which can be held is the same as the number of call park buttons 22.

Figure 7:
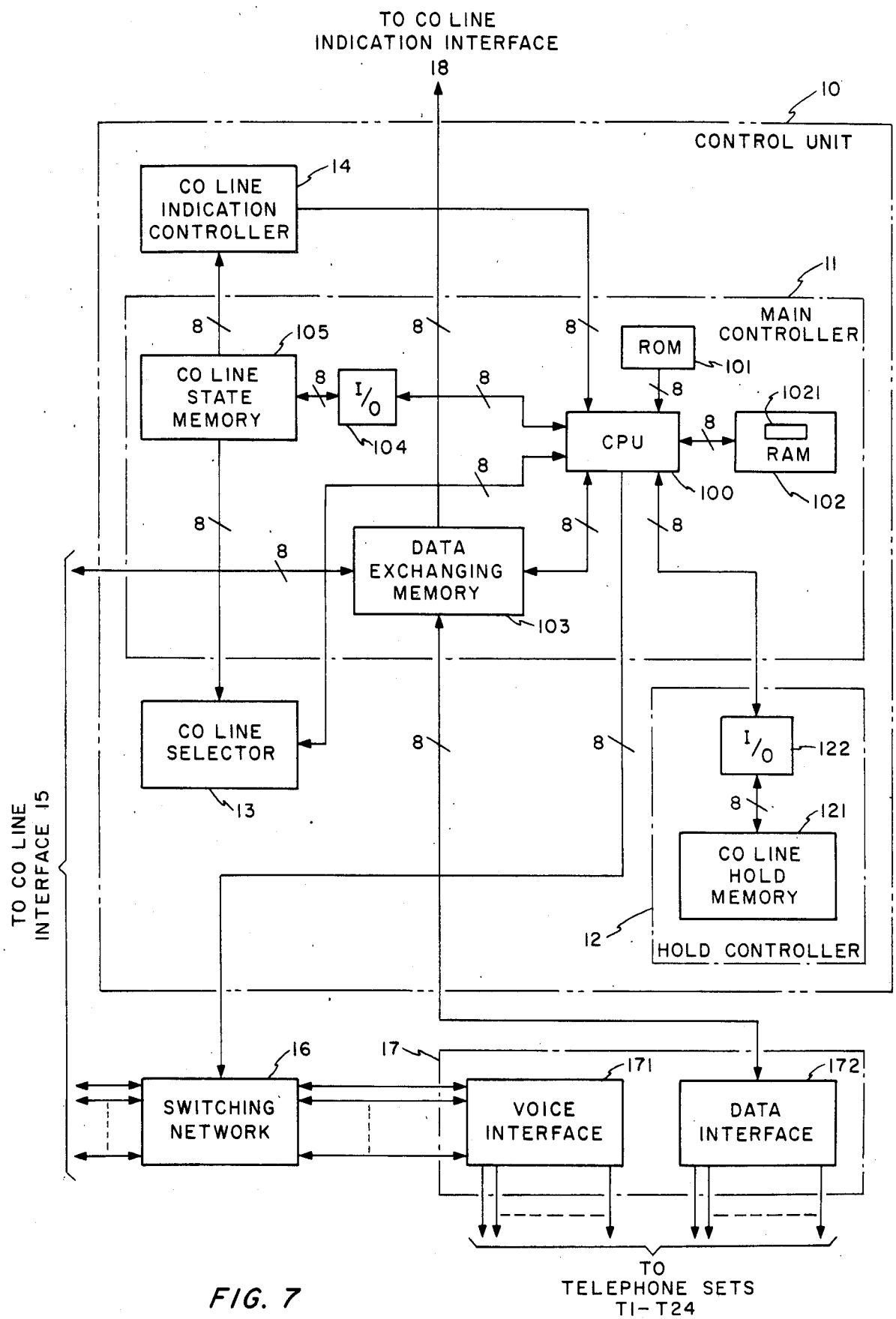
FIG. 7 is a block diagram of a detail in the embodiment of FIG. 1.

Referring to FIGS. 1 and 7, the construction and operation of the control unit 10 will be described. The unit 10 includes a hold controller 12 adapted to control the holding of the CO lines and re-answering of the held line. A CO line selector 13 selects the CO line which is idle or is receiving an incoming call and is generating seizing data which is representative of the selected CO line. A CO line indication controller 14 controls the lamp indication on the external indicators D1 to D4 responsive to the particular states of the CO lines. A main controller 11 performs various kinds of control which are assigned to the central unit 9.

The main controller 11 comprises a central processing unit (CPU) 100, a read only memory (ROM) 101 which stores control programs, a random access memory (RAM) 102 having a work area 1021 therein, a data exchanging memory 103, a writing/reading I/O circuit 104, and a CO line state memory 105. Each of the memories 103 and 105 is implemented by a RAM. The controller 11 periodically sends data to and receive data from the interfaces 15 and 172 and periodically sends data to the interface 18. Such data sending and receiving are executed by the CPU 100 via the exchanging memory 103 at each interval of one frame (32 milliseconds).

The data sent from the interface 15 to the memory 103 include incoming call data showing reception over the CO lines. The data sent from the memory 103 to the interface 15 include incoming call CO line seize data and dial data. The data from the interface 172 to the memory 103 include button data, which is an output of the telephone sets T1 to T24. The data fed in the opposite direction include lamp data applied to the telephone sets T1 to T24.

For a period of time S1 (10 milliseconds) in one time frame, the CPU 100 reads all the data out of the memory 103 and writes processing data intended for the interfaces 15, 172 and 18 into the memory 103. For the remaining period of time S2 (22 milliseconds), the interface 15, 172 and 18 read the processing data out of the memory 103 and write data associated with the respective CO lines and the respective telephone sets into the memory 103.

Figure 8:
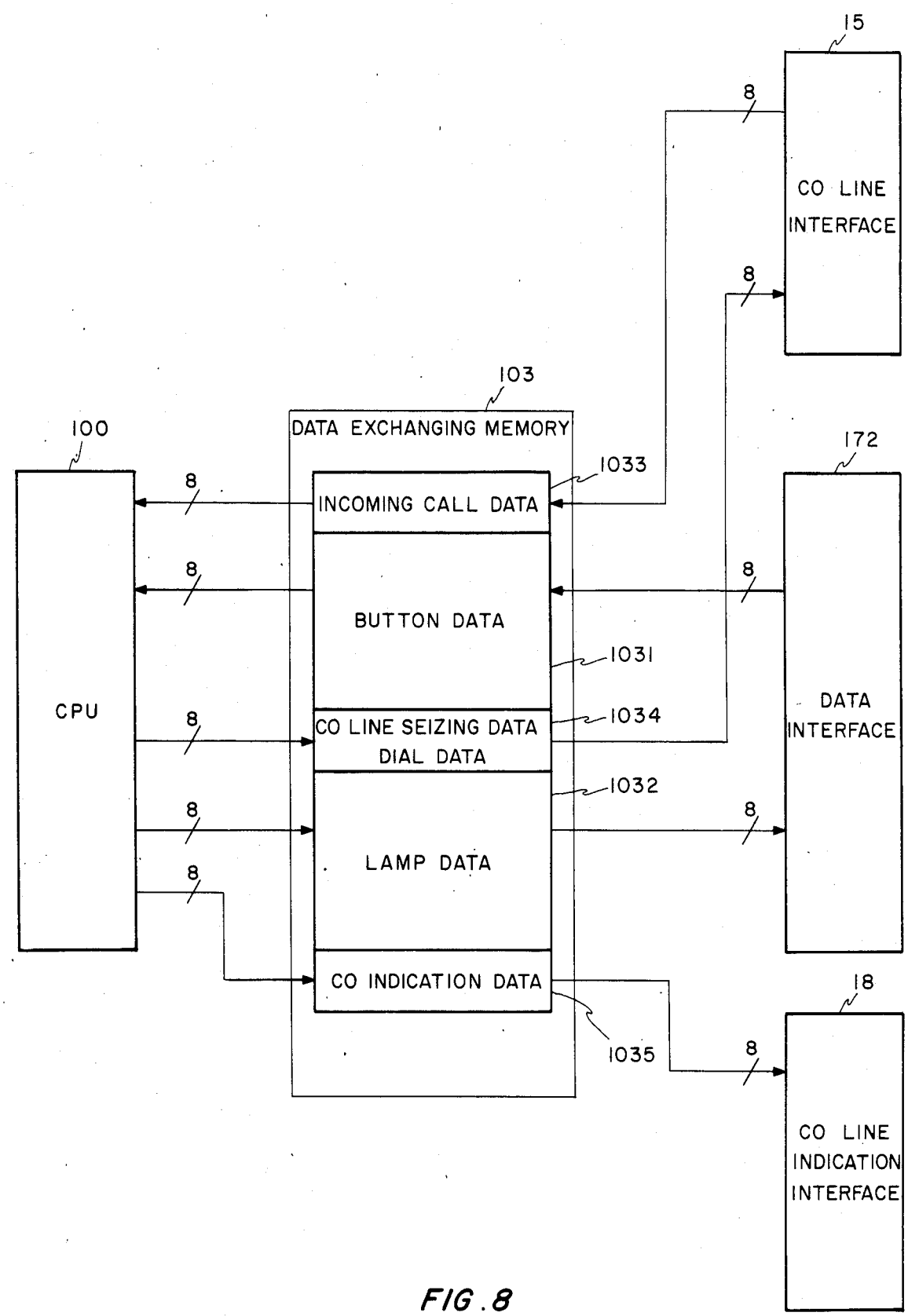
FIG. 8 is a block diagram which is representative of data exchange achieved in FIG. 7.
Figure 9:
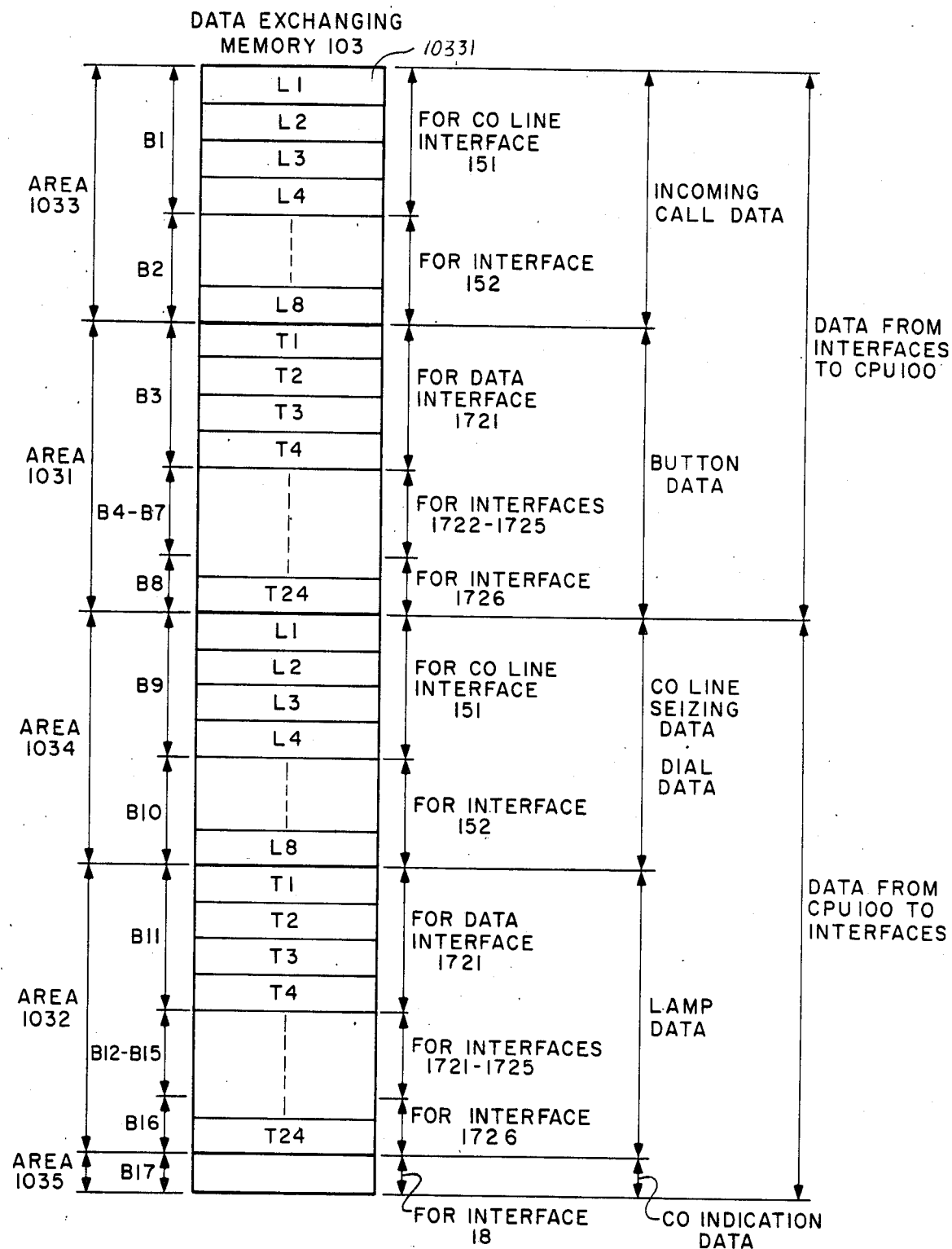
FIG. 9 shows details of a data exchanging memory.
Figure 10:
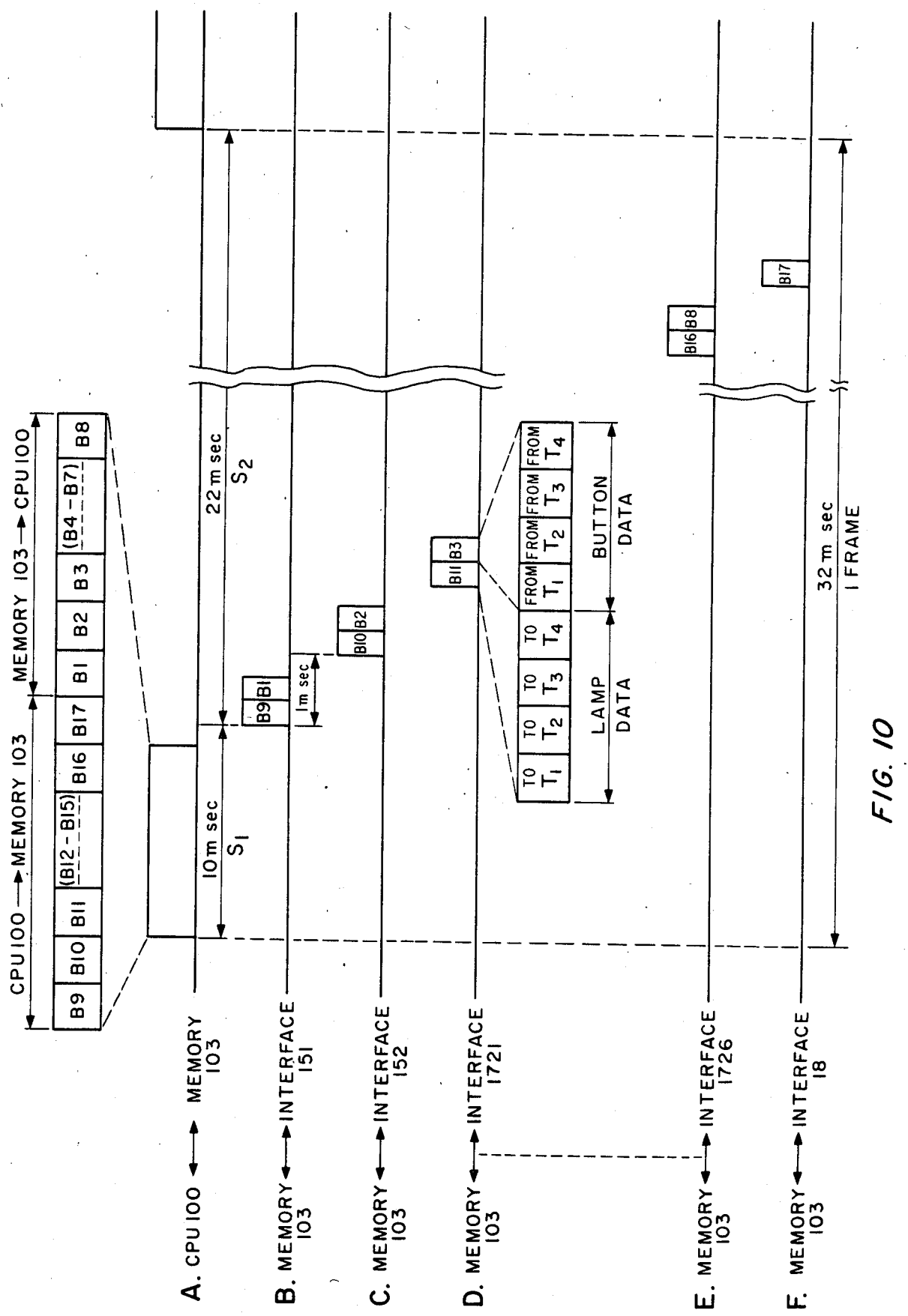
FIG. 10 is a timing chart for demonstrating details of the data exchange in FIG. 8.

Referring to FIGS. 8, 9 and 10, the data exchange outlined above will be described in detail.

The data exchanging memory 103 is constructed as shown in FIG. 8. The incoming call data from the interface 15 and the button data from the interface 172 are stored in areas 1033 and 1031 respectively, and each of these data is read out by the CPU 100. The CO line seizing data and the dial data from the CPU 100 are stored in an area 1034, the lamp data is stored in an area 1032, CO line indication data to be indicated by the indicators D1 to D4 is stored in an area 1035. These data are read out by the interfaces 15, 172 and 18, respectively.

As shown in FIG. 9, each of the discrete data (e.g. incoming call data 10331 associated with the CO line L1) has an 8 bits×4 bytes format and an address particular thereto. The data which constitutes one data block (8 bits×16 bytes) is arranged on a four CO lines or a four telephone sets basis; sixteen data block B1 to B16 are defined in total. For example, the data blocks B1 and B2 respectively are the incoming call data associated with the CO lines L1 to L4 and L5 to L8 which are to be sent from the interfaces 151 and 152 to the CPU 100. Likewise, the data blocks B3, ..., B8 respectively are the button data which are associated one with each four of the telephone sets, i.e. T1 to T4, ..., T21 to T24. The data blocks B9 and B10 respectively are the CO line seizing data and the dial data relating to the CO lines L1 to L4 and L5 to L8. The data block B11, ..., B16 are the lamp data relating one to each four of the telephone sets, i.e. T1 to T4, ..., T21 to T24. Further, a data block B17 is the CO indication data which is to be indicated by the CO line indicators D1 to D4 and which has an 8 bits×4 bytes format.

As shown in FIG. 10, the sequence of data exchange is repeatedly performed in the period of one time frame (32 milliseconds). As previously stated, one frame consists of the period of time S1 (10 milliseconds) and the period of time S2 (22 milliseconds). As shown in FIGS. 10A, within the period of time S1, the CPU 100 performs a sequence of steps: writing the seizing data and the dial data (the data blocks B9 and B10) in the area 1034, writing the lamp data (the data blocks B11 to B16) in the area 1032, writing the CO indication data (the data block B17) in the area 1035, reading the incoming call data (the data blocks B1 and B2) out of the area 1033, and reading the button data (the data blocks B3 to B8) out of the area 1031. Concerning the period of time S2, 1 millisecond is assigned to each of the interfaces. As shown in FIGS. 10B and 10C, the interfaces 151 and 152 respectively read the seizing data and the dial data (the data blocks B9 and B10) associated with the CO lines L1 to L4 and L5 to L8 out of the area 1034 and write the incoming call data (the data blocks B1 and B2) into the area 1033. Next, as shown in FIGS. 10C to 10E, the interfaces 1721 to 1726 sequentially read the lamp data (the data blocks B11 to B16) relating to their associated telephone sets T1 to T24 out of the area 1032 and write the button data (the data blocks B3 to B8) into the area 1031. Finally, the interface 18 reads the CO indication data (the data block B17) out of the area 1035.

Referring again to FIG. 7, the CPU 100 refers to the data stored in the exchanging memory 103 to determine the states of the CO lines L1 to L8 (idle, incoming, use, hold) and then writes the state of the line data which is representative of those states in the CO line state memory 105 via the I/O circuit 104.

The memory 105 stores the states of the respective CO lines in separate areas, as shown in FIG. 11A. Specifically, an 8 bits×1 byte area is assigned to each of the CO lines L1 to L8. As shown in FIG. 11B, such areas of the memory 105 individually store, in hexadecimal codes, the state data which is particular to the respective CO lines, which are: "00H" representative of an "idle" state, "01H" representative of an "incoming" state, "02H" representative of a "use" state, and "03H" representative of a "hold" state.

The CO line selector 13, (FIG. 7) refers to the state data stored in the memory 105 to select an idle CO line at the time of the outgoing call initiation and a receiving CO line at the time of an incoming call reception and, thereby, feeds the seizing data for seizing the idle CO line or the receiving CO line to the CPU 100. The seizing data is sent through the exchanging memory 103 to the interface 15 so as to seize the CO line.

The CO line indication controller 14 periodically scans the state memory 105 to read out the states of the CO lines and sends them to the CPU 100 as the CO line indication data for causing the external indicators D1 to D4 to display the CO line states. The CPU 100 writes the indication data in the area 1035 (FIG. 8) of the exchanging memory 103, while as previously stated the contents of the area 1035 are read out and displayed in the interval of every 32 milliseconds.

The hold controller 12 (FIG. 7) includes a CO line hold memory 121 having areas assigned to the call park buttons 22 and shared by all the telephone sets, and includes an I/O circuit 122 for controlling writing and reading operations of data in and out of the memory 121.

As shown in FIG. 12A, in the hold memory 121, an 8 bits×1 byte area is assigned to each of the call park buttons of the telephone set. These areas store hold data, in hexadecimal codes, which is particular to their associated CO lines, such as shown in FIG. 12B, in which L1 is "10H", L2 "11H", ..., L8 "17H". As long as the call park is idle, with no CO line being held, data "00H" is written in the associated area.

The operations for initiating an outgoing call, receiving an incoming call, and holding a call may be controlled from any of the telephone sets and will be described together with the operation of the buttons of the telephone set and the changes in the states of the lamps.

INITIATING AN OUTGOING CALL

Assume a case where a user operates the telephone set T1 to place an outgoing call by seizing the idle CO line L7. As the user lifts the telephone set T1 off-hook and then presses the outgoing call button 24, the CPU 100 of the main controller 11 detects a reception of button data generated by the depression of the button 24, the reception being via the data interface 172 and the exchanging memory 103.

Figure 13:
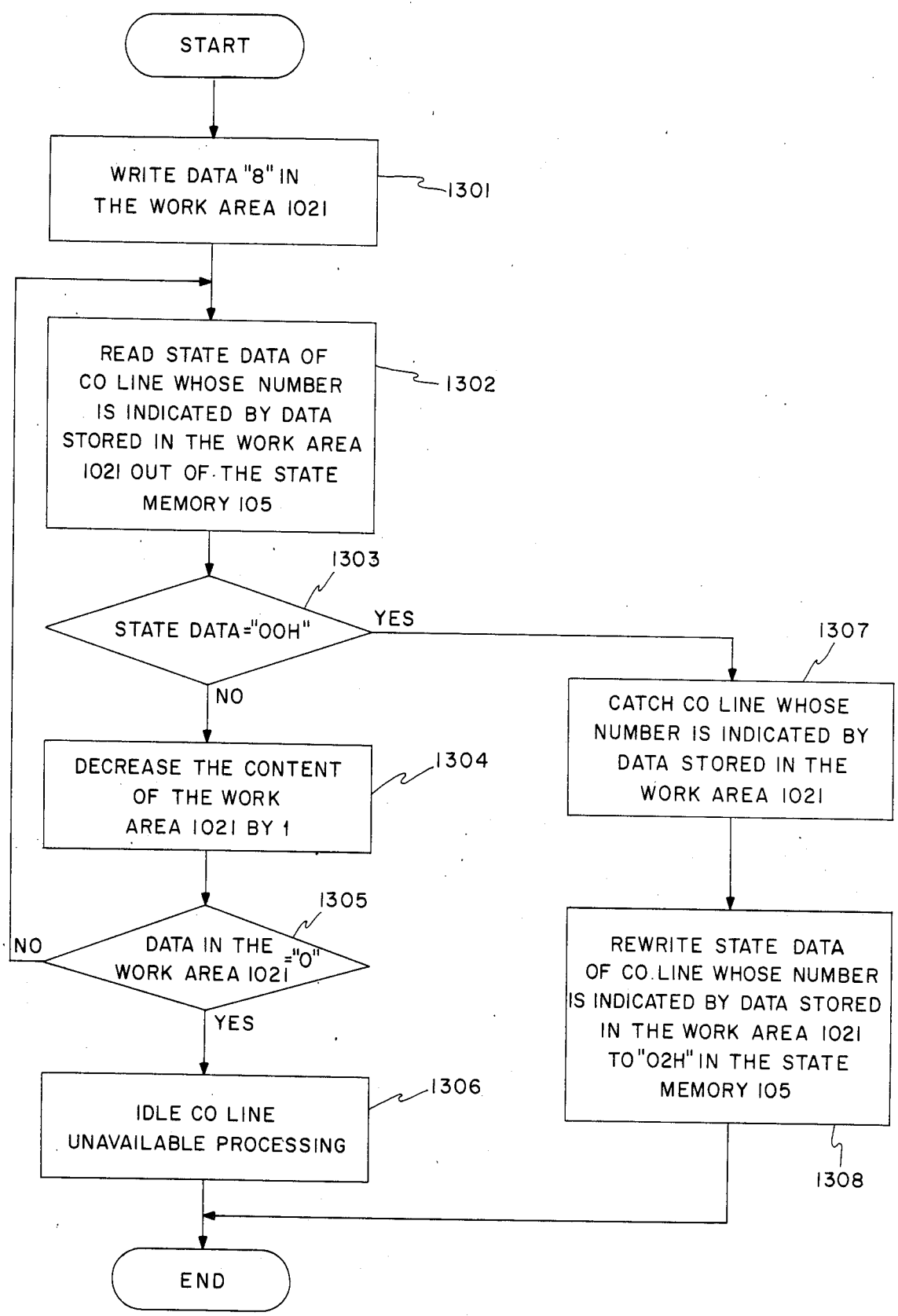
FIGS. 13, 14, 15 and 16 are flow charts respectively demonstrating an outgoing call initiating procedure, an incoming call receiving procedure, a holding procedure, and a hold cancelling procedure in the embodiment of FIG. 1.

This causes the CO line selector 13 to start on the control sequence shown in the flow chart of FIG. 13. First, data "8" is written in the work area 1021 of the RAM 12 which is adapted to temporarily store a CO line number, a call park number and other data (STEP 1031). This data "8" is used to determine whether the CO line L8 can be seized in the subsequent processing. If the CO line can be seized, the decision will be sequentially repeated with the other CO lines L7, L6, ..., L1 in this order so that the content of the work area 1021 will be sequentially changed to "7", "6", ..., "1". Next, the state data "02H" (FIGS. 11A) is read out of the area of the state memory 105 which is associated with the CO line L8 (an area associated with the CO line having a number which is represented by the data "8" stored in the work area 1021) (STEP 1302).

Then, a decision is made on whether the state data "02H" is the idle state data "00H", meaning that the CO line L8 is available for initiating an outgoing call (STEP 1303). Since it is assumed that the CO line L8 is currently in use and, therefore, cannot be seized, the result of the decision at the STEP 1303 is "NO" so that the content of the work area 1021 is decreased by 1 (STEP 1304). This is followed by determining whether the content of the work area 1021 is "0" in order to determine whether all the CO lines down to L1 have been checked (STEP 1305). The result of the STEP 1305 is "NO", causing the operation to return to the STEP 1302. In the same manner, at the STEP 1302, the state data associated with the CO line L7 is read out.

Since it is assumed that the CO line L7 is idle, "00H" (FIG. 11A), the decision at the STEP 1303 is "YES", with the result that the CO line L7 is selected as designated by the content of the work area 1021 (STEP 1307). The seizing data is indicative of the acquisition of the CO line L7 and is fed to the CPU 100 (FIG. 7). The CPU 100 applies the seizing data to the interface 15 via the memory 103, whereby the CO line L7 is seized. At the same time, the CPU 100 controls the switching network 16 to set up a communication path between the telephone set T1 and the CO line L7.

Further, the CPU 100 sends lamp data for the telephone set T1 to the exchanging memory 103 within the period of time S1, shown in FIG. 10. The data is read by the interface 172 (FIG. 7) and then discriminated by the lamp data converter 35 (FIG. 5). The lamp controller 32 causes the outgoing call lamp 26 to glow, in green. Thereafter, state data "02H" which is representative of a busy or in use state is written in the area of the state memory 105 which is associated with the CO line L7 (STEP 1308) in FIG. 13. If all of the CO lines L1 to L8 are busy, "00H", the decision at the STEP 1305 is "YES" so that idle CO line unavailable processing inclusive of delivery of a busy tone and a glowing of the lamp 26, in red, is performed (STEP 1306).

Meanwhile, after the STEP 1308, the state memory 105 (FIG. 7) indicates that the CO line L7 is in use. Hence, the indication controller 14 generates indication data which is representative of the use state of the CO line L7. This indication data is written in the area 1305 of the exchanging memory 103 by the CPU 100, while the indication interface 18 reads it out. As a result, the lamps 180 (FIG. 4) of the indicators D1 to D4, which are associated with the CO line L7, are turned on to show that the CO line L7 is in use.

Thereafter, as the user dials a desired subscriber's number by depressing the dial buttons 28 (FIGS. 5, 6) of the telephone set T1, these depressions are detected by the button detector 31 and then converted by the data converter 34 to codes (button data) which are particular to the depressed buttons. The output data of the converter 34 are applied to the interface 15 (FIGS. 1, 8) via the circuit 30, the interface 172, the area 1031 of the memory 103, the CPU 100, and the area 1034 of the memory 103. The interface 15 sends dial signals over the CO line L7. Initiation of an outgoing call on any of the CO lines is completed by the above procedure.

It will be noted that the handset 20 may be picked up after pressing the button 24. It will also be noted that intercommunication between the telephone sets T1 to T24 may be set up by lifting the handset 20 off-hook and then entering a desired extension number.

RECEIVING AN INCOMING CALL

Assume that an incoming call has been received over the CO line L1 and is to be answered at the telephone set T1. When the incoming call is detected by the interface 15 (FIG. 1), it sends incoming call data to the CPU 100 (FIG. 7) via the area 1033 (FIG. 8) of the exchanging memory 103. In response, the CPU 100 writes state data "01H" representative of an incoming state in the area of the state memory 105 (FIG. 7) which is assigned to the CO line L1. As the indication controller 14 reads out the data "01H" to generate incoming call indication data, the lamps 180 of the external indicators D1 to D4 associated with the CO line L1 are caused to flash rapidly to display the reception of an incoming call. Further, the CPU 100 generates lamp data which causes the answer lamps 27 of all the telephone sets T1 to T24 to flash in red. This lamp data is fed from the CPU 100 to the respective telephone sets T1 to T24 via the area 1032 of the memory 103 and the interface 172. When the answer button 25 is pressed at the telephone set T1 where the lamp 27 is flasing in red, the CPU 100 activates the CO line selector 13 responsive to the resulting button data.

Figure 14:
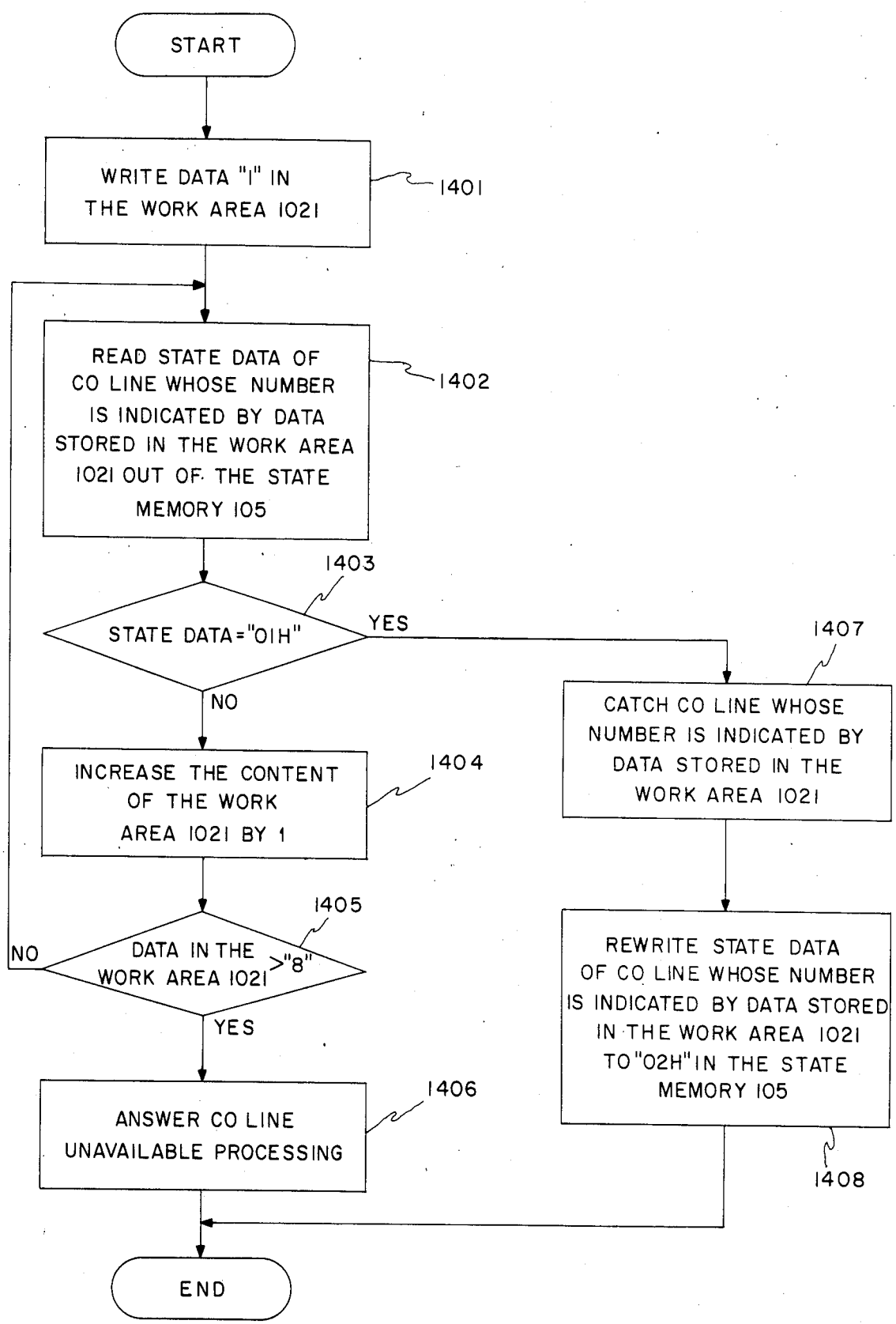

The selector 13 then performs the control shown in FIG. 14. First, data "1" is written in the work area 1021 of the RAM 102 (STEP 1401) in FIG. 14. This data "1" is used in the subsequent processing for determining whether or not the incoming call which is present on the CO line L1 is to be answered. If it is unable to be answered, the decision will be sequentially made with the other CO lines L2, L3, ..., L8 in this order. Therefore, the content of the work area 1021 will be sequentially changed to "2", "3", ..., "8". Next, the state data "01H" (FIG. 11A) is read out of the area of the state memory 105 which is assigned to the CO line L1 (an area associated with the CO line whose number is represented by the data "1" stored in the work area 1021) (STEP 1402).

Then, the circuit decides whether or not the state data "01H" is the state data "01H", that is indicative of an incoming state which is able to be picked up for answering (STEP 1403). At this instant, since the CO line L1 has received an incoming call and is ready to be seized, the result of the STEP 1403 is "YES" so that the CO line L1 represented by the content of the work area 1021 is selected (STEP 1407). The CO line seizing data meant for the CO line L1 is applied to the CPU 100. In response, the CPU 100 writes the seizing data into the exchanging memory 103, together with lamp data for the telephone sets.

Based on the seizing data, the interface 15 (FIG. 1) seizes the CO line L1 over which the incoming call has been received. Responsive to the lamp data, the telephone set T1 which has responded to the incoming call turns on its answer lamp 27, in green, while the other telephone sets T2 to T24 turn off their lamps 27. The switching network 16 which is controlled by the CPU 100 sets up a communication path between the telephone set T1 and the CO line L1. Thereupon, state data "02H" which is representative of a use state is stored in the area of the state memory 105 which is associated with the CO line L1 (STEP 1408) of FIG. 14. Meanwhile, if the result of the STEP 1403 is "NO", the content of the work area 1021 (FIG. 7) is increased by 1 (STEP 1404). In this manner, the STEPS 1402 and 1403 are repeated with respect to all of the CO lines down to L8 (STEP 1405). If none of the CO lines which are receiving the incoming call has been found, answer CO line unavailable processing is performed inclusive of sending busy tone (STEP 1406).

After the STEP 1408, the indication controller 14 (FIG. 1) reads the state data, relating to the CO line L1, out of the state memory 105, and generates indication data which is indicative of the fact that the CO line L1 is in use. This indication data is written in the area 1035 of the exchanging memory 103 by the CPU 100. The indication interface 18 reads the indication data out of the area 1035 and, then, turns on the lamps 180 of the external indicators D1 to D4 which are associated with the CO line L1, thereby showing that the CO line L1 is being used.

HOLDING THE CO LINES

As the user, who is using the telephone set T1 to communicate with the other party over the CO line L1, depresses the hold button 23 to hold the CO line L1, button data is applied to the CPU 100 as a hold instruction.

Figure 15:
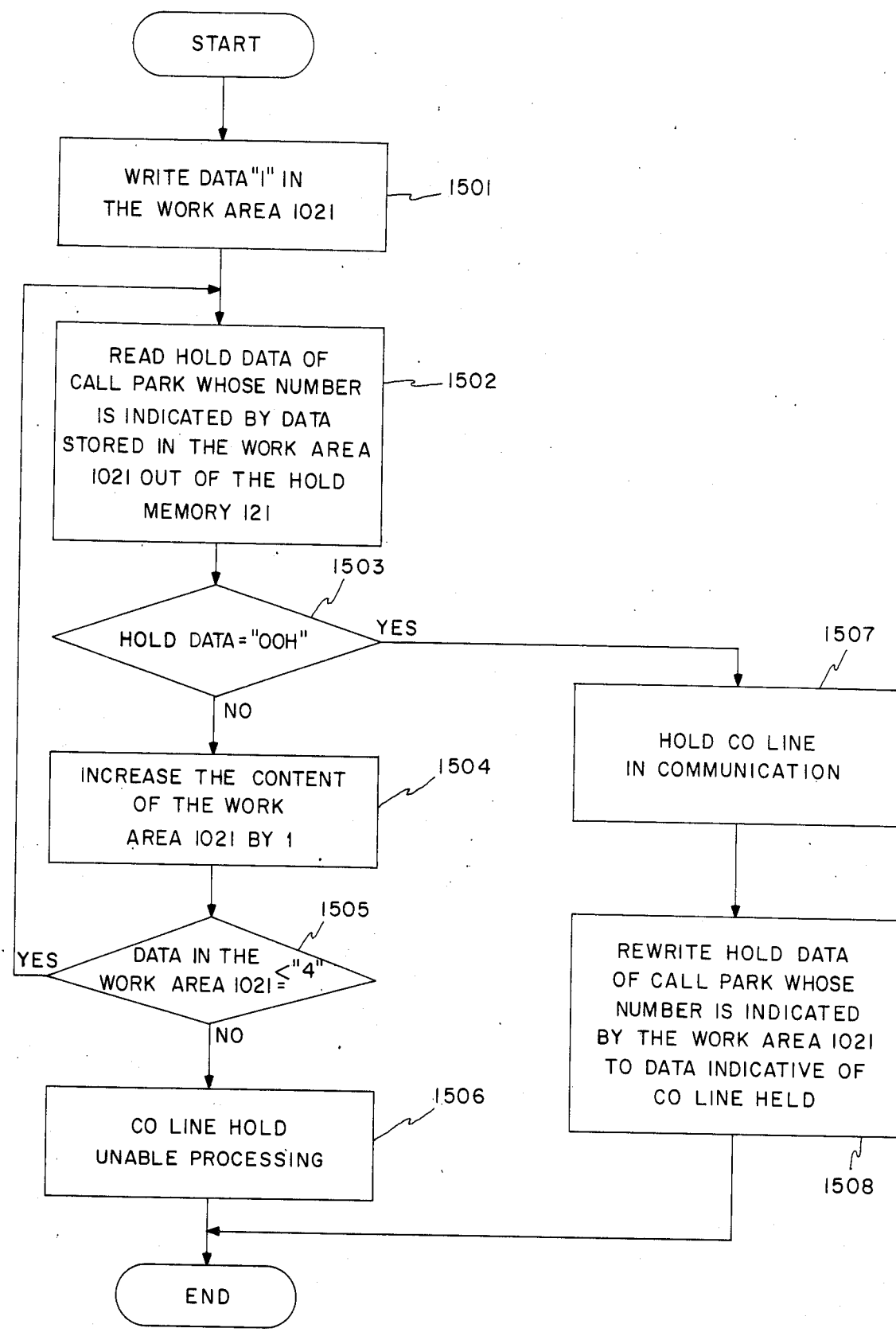

The hold controller 12 (FIG. 1) performs a control as shown in FIG. 15. First, data "1" is written in the work area 1021 of the RAM 102 (FIG. 7) in order to temporarily store the call park number which is being processed (STEP 1501). This is to sequentially scan the call parks 1 to 4 to find an idle one. Next, CO line hold data "00H" (FIG. 12A) is read out of an area of the CO line hold memory 121 which is associated with the call park 1 (an area associated with a call park having a number which is represented by the data "1" stored in the work area 1021) (STEP 1502).

This is followed by a decision as to whether or not the data "00H" mentioned above is the data "00H" which is representative of an idle state (STEP 1503). In this case, the result of the decision is assumed to be "YES". The I/O circuit 122 sends a control signal to the CPU 100 (FIG. 7) in order to hold the CO line L1. In response to this signal, the CPU 100 controls the switching network 16 to hold the CO line L1 and send a hold tone to the CO line L1. Further, responsive to the control signal from the I/O circuit 122, the CPU 100 writes state data "03H" which is indicative of the hold state in an area of the state memory 105 which is associated with the CO line L1 (STEP 1507). Hold data "10H" is indicative of the held CO line L1 and is written in an area of the hold memory 121 which is associated with the call park 1 (STEP 1508).

If the result of the STEP 1503 is "NO", implying that the call park 1 is occupied by another CO line, the content of the work area 1021 is increased by 1 (STEP 1504). Then, a decision is made as to whether all of the call parks have been searched (STEP 1505). The STEPS 1502 and 1505 are repeated thereafter. If all of the call parks are occupied, the result of the STEP 1505 is "NO" so that the operation advances to CO line hold unable processing (STEP 1506). The STEP 1506 may comprise sending an audible signal which is representative of the hold unable state or reconnecting the telephone set to the CO line on which the communication has been held.

After the writing operation for the hold data in the hold memory 121 at the STEP 1508 has been completed, the CPU 100 generates lamp data for the respective telephone sets. In response to the lamp data, the first one (call park 1) of the call park lamps 21 (FIG. 5) at each of the telephone sets T1 to T24 flashes to show that the CO line L1 has been held at the call park 1. Further, the lamp 180 (FIG. 4) of each of the indicators D1 to D4 which is associated with the CO line L1 flashes slowly to indicate the hold state.

When the CO line L1 which is being held as stated above, is to be taken over by the telephone set T2, the first one (call park 1) of the call park buttons 22 at the telephone set T2 is depressed. The CPU 100 reads the call park button data out of the exchanging memory 103 and, then, activates the hold controller 12.

Figure 16:
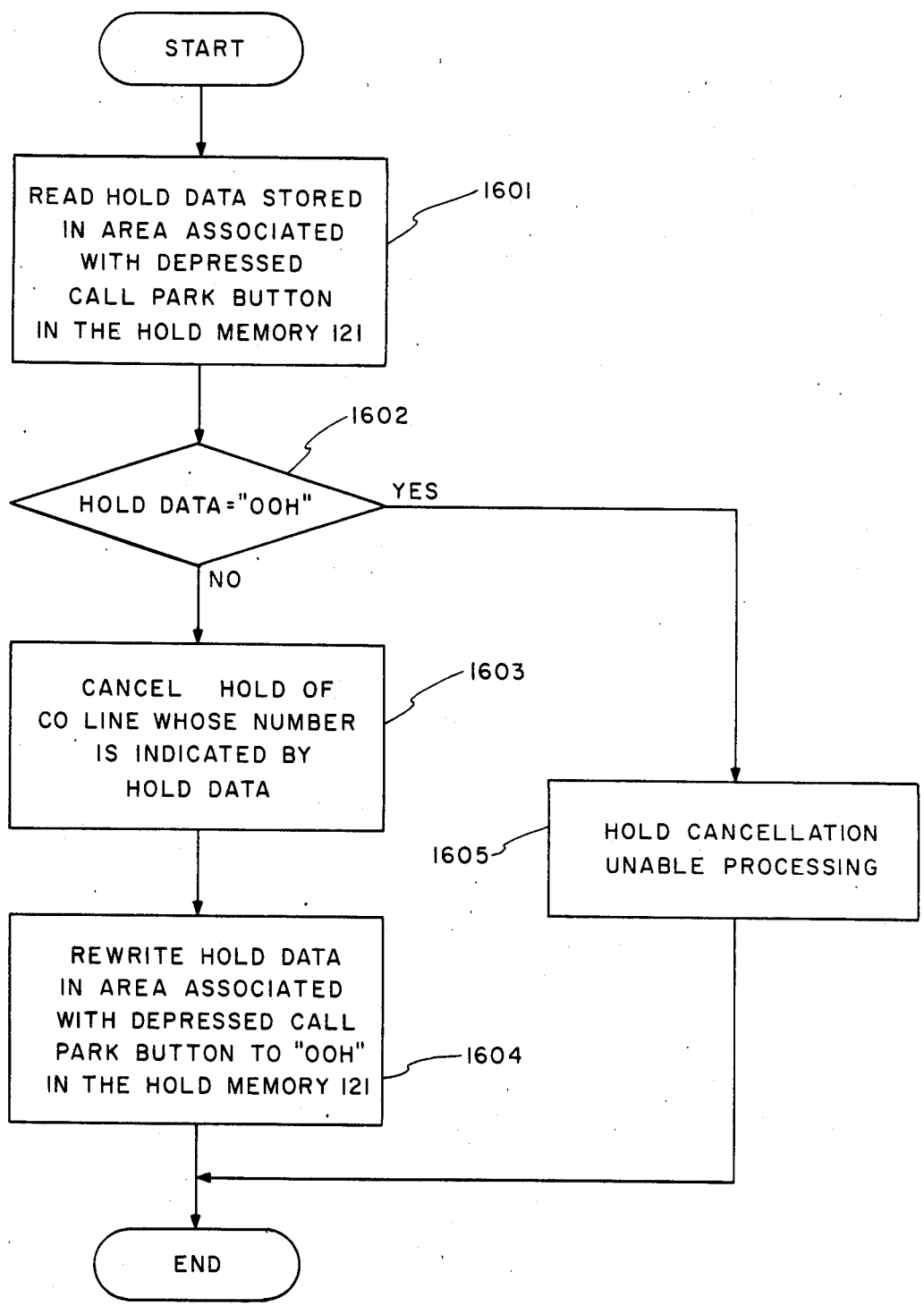

The controller 12 performs a control as shown in FIG. 16. The hold data "10H" stored in the area of the hold memory 121, which is associated with the call park 1, is read out (STEP 1601) to determine whether the CO line is being held (STEP 1602). Since the CO line L1 is being held, i.e., "10H"~"00H", the result of the decision is "NO" so that the CPU 100 controls the switching network 16 to cancel the hold state of the CO line L1 and to connect the CO line L1 to the telephone set T2.

In the state memory 105 (FIG. 11A), the state data of the CO line L1 turns from data "03H" (hold state) to data "02H" (use state). The lamps 180 (FIG. 4) of the indicators D1 to D4 associated with th CO line L1 turn on to show the busy state. Since the telephone set T2 has responded to the CO line L1 to cancel the hold state, due to the depression of the call park 1 button, the CO line answer lamp 27 (FIG. 6) glows in green responsive to the lamp data from the CPU 100. In the meantime, the call park 1 lamps of all the telephone sets T1 to T24 are turned off to indicate the cancellation of the hold state (STEP 1603) of FIG. 16. Then, data "00H", which is indicative of a no-hold state, is written in the area of the hold memory 121 which is associated with the call park 1 (STEP 1604).

In this manner, the incoming call received by the telephone set T1 at first is transferred to the telephone set T2. If the result of the STEP 1602 is "YES", meaning that no CO line is being held, hold cancellation unable processing is performed (STEP 1605). The STEP 1605 may comprise sending a predetermined audible signal or, alternatively, restoring the telephone set T2 to the off-hook state and then sending dial tone.

Each of the telephone sets T1 to T24 is capable of simultaneously holding a number of CO lines which is the same as the number of hold data (CO line numbers to be held) which may be stored in the hold memory 121, i.e., the number of call park buttons 21. Further, the hold state can be cancelled at any of the telephone sets.

When the telephone set has been restored to the on-hook state after a communication, in response to hook switch data, the switching network 16 interrupts the communication path. The CPU 100, responsive to the hook data, writes idle state data "00H" in an area of the state memory 105 which is associated with the CO line that has completed a communication. Also, the use state indication on the indicators D1 to D4 and the answer lamp 27 of the telephone set, which has glowed in green, are turned off.

In this embodiment, the various lamps have been shown and described as selectively glowing in green and in red, flashing and turning off to indicate various states. Other suitable modes of indication may be used.

The described number of CO lines, number of telephone sets, number of call parks (i.e., the number of CO lines which may be held at the same time), and number of external indicators which have been shown and described are not limiting. Especially, the number of call parks do not need to be equal to the number of CO lines and may be determined in conformity to particular conditions of use of the KT system.

A key number system may be adopted at the central office for the CO lines L1 to L8. Then, for a more efficient use of the CO lines, a key number may be assigned to the CO line L1 such that while the line L1 is busy, an incoming call is sequentially received over the other lines L2, L3, ..., L8, and outgoing calls are sequentially initiated by the CO lines L1, L2, ..., L8.

Further, the KT system of this invention may be furnished with a known function of allowing one to hold a communication while maintaining a handset in an on-hook state.

In summary, it will be seen that in accordance with this invention, any desired number of external CO line indicators show states of respective CO lines to eliminate the need for CO lamps otherwise installed in each telephone set, thereby cutting down the dimensions and cost of the telephone set. The small size, low cost design of the telephone set is further enhanced. Simultaneously, an easy operation is achieved because the use of an outgoing call button adapted for selection of an idle CO line and a CO line answer button adapted for response to an incoming call makes it unnecessary to equip each telephone set with CO buttons. In addition, while call park buttons and call park lamps are additionally installed for holding CO lines, they are smaller in number than the CO lines which are accommodated by the KT system and are exclusively used for holding purposes, prompting the ease of CO line transfer operation.

Although this invention has been shown and described with reference to the preferred embodiments thereof, and in terms of the illustrative drawings, it should not be considered as limited thereby. Various possible modifications, omissions, and alterations to the embodiments could be conceived by one skilled in the art without departing from the scope of this invention defined by the appended claims.

Those who are skilled in the art will readily perceive how to modify the invention. Therefore, the appended claims are to be construed to cover all equivalent structures which fall within the true scope and spirit of the invention.

What is claimed is:

1. A key telephone system comprising:
a plurality of telephone sets, each set having a hold button for temporarily holding a central office line over which a communication is being held, a plurality of call park lamps for temporarily indicating that said central office line is being held, a plurality of call park buttons individually associated with said call park lamps, an outgoing call button for seizing an idle one of the central office lines when an outgoing call is to be initiated, and an answer button for seizing one of the central office lines over which an incoming call is being received so as to respond to said incoming call;
at least one external indicator for indicating various states of each of the central office lines; and
a central unit having hold control means for selectively energizing said call park lamps to indicate when said central office lines are being held responsive to an operation of said hold button and for controlling a response to that central office line in response to an operation of one of said call park buttons, central office line selecting means for selecting and seizing an idle one of the central office lines in response to an operation of said outgoing call button and for selecting and seizing one of the central office lines over which an incoming call is being received in response to an operation of said answer button, and central office line indication control means for controlling said external indicator to indicate various states of said central office lines.

2. A key telephone system as claimed in claim 1 wherein said central unit further includes first store means for storing the various states of said respective central office lines.

3. A key telephone system as claimed in claim 2 and means associated with the central office line selecting means for referring to said first store means to select said idle central office line or said central office line over which an incoming call is being received.

4. A key telephone system as claimed in claim 3 wherein said central unit accommodates N (an integer equal to or greater than 2) central office lines; and
said central office line selecting means comprises means responsive to an incoming call for seizing the central office line over which the incoming call is being received by sequentially scanning the central office lines beginning with the first central office line, and responsive to an outgoing call for seizing said idle central office line by sequentially scanning said central office lines, beginning with the N-th central office line.

5. A key telephone system as claimed in claim 2 and means associated with the central office line indication control means for referring to said first store means to generate data for indicating the various states of said respective central office lines.

6. A key telephone system as claimed in claim 2 wherein said hold control means further includes second store means having a number of hold store areas equal to the number of said call park buttons, said hold store areas storing respective data which are representative of said central office lines that are being held.

7. A key telephone system as claimed in claim 6 and means wherein said hold control means operates in response to the operation of said hold button for sequentially searching said hold store areas to store number data assigned to the central office line which is to be held, and storing said number data in one of said hold store areas which does not at that time have central office line number data and means wherein said hold control means operates in response to the operation of one of said call park buttons to connect said central office line represented by said number data stored in one of said hold store areas which corresponds to the operated call park button of said telephone set having the operated call park button.

8. A key telephone system as claimed in claim 3 wherein said hold control means further includes second store means having a number of hold store areas equal to the number of said call park buttons, said store areas storing respective data which are representative of the central office lines that are being held.

9. A key telephone system as claimed in claim 8 and means wherein the hold control means operates in response to the operation of said hold button for sequentially searching said store areas of said second store means to store number data assigned to the central office line to be held, said storage being in one of said second store areas which then stores no central office line number data and in response to the operation of one of said call park buttons to connect said central office line represented by said number data stored in one of said store areas which is associated with the operated call park button and with said telephone set with the operated call park button.

* * * * *